(12) United States Patent
Morita et al.

(10) Patent No.: US 10,399,174 B2
(45) Date of Patent: Sep. 3, 2019

(54) SWITCHING ELECTRODE AND RESISTANCE WELDING DEVICE USING SAME, SPOT WELDING DEVICE AND SPOT WELDING METHOD

(71) Applicant: HONDA MOTOR CO., LTD., Tokyo (JP)

(72) Inventors: Takahiro Morita, Tochigi (JP); Shinichi Miyasaka, Tochigi (JP); Yosuke Hiruma, Tochigi (JP); Akira Goto, Tochigi (JP); Tatsuro Ikeda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 997 days.

(21) Appl. No.: 14/401,721

(22) PCT Filed: Apr. 30, 2013

(86) PCT No.: PCT/JP2013/062671
§ 371 (c)(1),
(2) Date: Nov. 17, 2014

(87) PCT Pub. No.: WO2013/172202
PCT Pub. Date: Nov. 21, 2013

(65) Prior Publication Data
US 2015/0136742 A1 May 21, 2015

(30) Foreign Application Priority Data
May 18, 2012 (JP) .................................. 2012-114320
Jun. 5, 2012 (JP) .................................. 2012-127808

(51) Int. Cl.
*B23K 11/16* (2006.01)
*B23K 11/24* (2006.01)
(Continued)

(52) U.S. Cl.
CPC .............. *B23K 11/16* (2013.01); *B23K 11/11* (2013.01); *B23K 11/115* (2013.01); *B23K 11/24* (2013.01);
(Continued)

(58) Field of Classification Search
CPC ..... B23K 11/00; B23K 11/115; B23K 11/314; B23K 11/315; B23K 11/36;
(Continued)

(56) References Cited

U.S. PATENT DOCUMENTS 4,503,312 A * 3/1985 Nakata ................. B23K 11/255
219/110
4,591,687 A 5/1986 Urech
(Continued)

FOREIGN PATENT DOCUMENTS

| FR | 2486706 | 1/1982 |
|----|---------|--------|
| JP | 58-159986 | 9/1983 |

(Continued)

OTHER PUBLICATIONS

Partial European Search Report dated Apr. 13, 2016, 6 pages.
(Continued)

*Primary Examiner* — Ibrahime A Abraham
*Assistant Examiner* — Justin C Dodson
(74) *Attorney, Agent, or Firm* — Rankin, Hill & Clark LLP

(57) ABSTRACT

The invention provides a switching electrode which has a small variation in resistance value even when a large amount of current is repeatedly cut off and can carry a stable amount of current even when it is continuously used. In the invention, the switching electrode is used in a switch which includes a first switching electrode tip (21) and a second switching electrode tip (22), brings the first switching electrode tip (21) and the second switching electrode tip (22)

(Continued)

into surface contact with each other to carry a current, and separates the first switching electrode tip (21) and the second switching electrode tip (22) to cut off the current. At least one of contact surfaces of the first switching electrode tip (21) and the second switching electrode tip (22) is a flat surface having an uneven portion.

1 Claim, 8 Drawing Sheets

(51) Int. Cl.
  *B23K 11/30* (2006.01)
  *B23K 11/11* (2006.01)
  *B23K 11/31* (2006.01)
  *B23K 11/36* (2006.01)
  *H01H 1/06* (2006.01)
(52) U.S. Cl.
  CPC ........ *B23K 11/3009* (2013.01); *B23K 11/314* (2013.01); *B23K 11/36* (2013.01); *H01H 1/06* (2013.01)
(58) Field of Classification Search
  CPC ............ B23K 37/0443; B23K 37/0435; B23K 37/0408; B23K 2201/18; B23K 2203/04; B23K 11/253; B23K 11/255; B23K 11/30; B23K 11/3009; B23K 11/3081; B23K 11/311
  USPC ... 219/86.1, 86.22, 86.33, 87, 90, 91.2, 119, 219/117.1, 161, 78.01, 86.24, 86.25, 219/86.41, 86.51, 86.61, 86.7, 91.1, 102, 219/110
  See application file for complete search history.

(56) References Cited

U.S. PATENT DOCUMENTS

| | | | |
|---|---|---|---|
| 4,972,047 | A | 11/1990 | Puddle et al. |
| 5,194,709 | A * | 3/1993 | Ichikawa ............. B23K 11/253 219/109 |
| 6,294,753 | B1 * | 9/2001 | Fujii ................... B23K 11/252 219/110 |
| 2010/0243616 | A1 * | 9/2010 | Goto ................... B23K 11/0026 219/117.1 |
| 2011/0180518 | A1 * | 7/2011 | Hasegawa ............. B23K 11/115 219/108 |
| 2011/0233174 | A1 * | 9/2011 | Shibata ................ B23K 11/115 219/91.2 |
| 2013/0153544 | A1 | 6/2013 | Goto et al. |
| 2013/0180961 | A1 | 7/2013 | Goto et al. |

FOREIGN PATENT DOCUMENTS

| | | |
|---|---|---|
| JP | 62-156085 | 7/1987 |
| JP | 2008-246538 | 10/2008 |
| JP | 2009-241112 | 10/2009 |
| JP | 2009-245684 | 10/2009 |
| JP | 2011-194464 | 10/2011 |
| JP | 2012-011398 | 1/2012 |
| WO | 2012/033040 | 3/2012 |
| WO | 2012/043587 | 4/2012 |

OTHER PUBLICATIONS

International Search Report, dated Jun. 25, 2013 (Jun. 25, 2013).
Indian Office Action dated Jan. 30, 2019, 7 pages.
Brazilian Office Action dated Jun. 11, 2019, Application No. BR122019001107-9, 6 pages.

* cited by examiner

FIG. 7
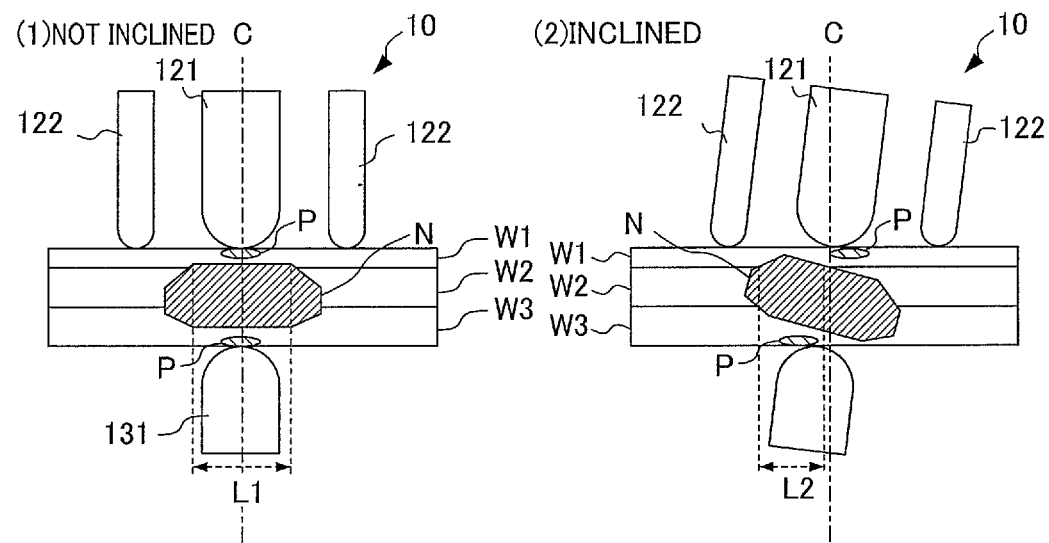
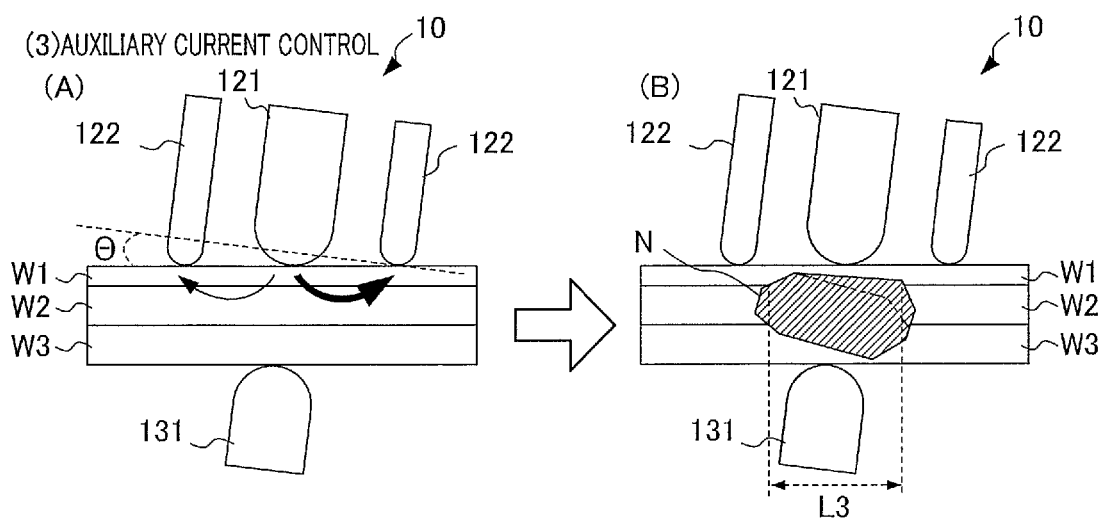

FIG. 9

(1) RESISTANCE CONTROL

(A) WHEN INCLINED

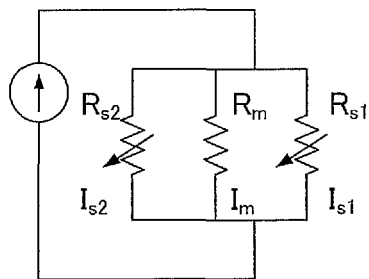

$R_{s1}$: DECREASE, $R_{s2}$: INCREASE
⇓
$I_{s1}$: INCREASE, $I_{s2}$: DECREASE (B) DURING ABNORMAL CONTACT

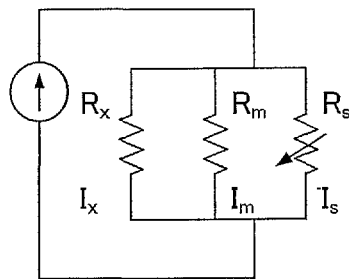

$R_s$: DECREASE
⇓
$I_s$: INCREASE $I_m$: MAIN CURRENT
$I_{s(1,2)}$: AUXILIARY CURRENT
$I_x$: CURRENT TO ABNORMAL CONTACT PORTION

(2) CURRENT CONTROL

(A) WHEN INCLINED

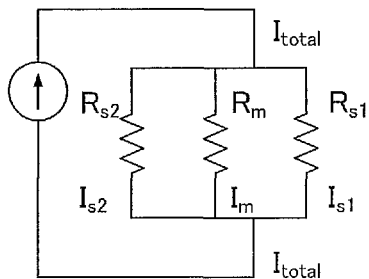

$I_{total}$: INCREASE (8KA→11KA)
⇓
$I_{s1}$: INCREASE (B) DURING ABNORMAL CONTACT

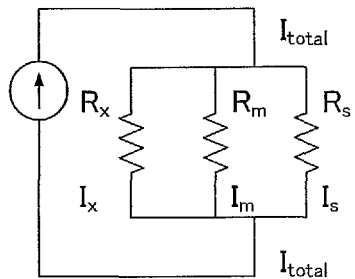

$I_{total}$: INCREASE (8KA→11KA)
⇓
$I_s$: INCREASE

(3) SWITCHING TIME CONTROL

(A) WHEN INCLINED

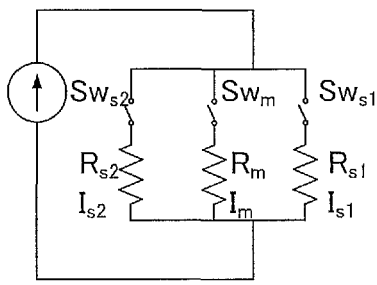

$Sw_{s2}$: FIRST, $Sw_{s1}$: LATER
⇓
ENSURE HEATING TIME (B) DURING ABNORMAL CONTACT

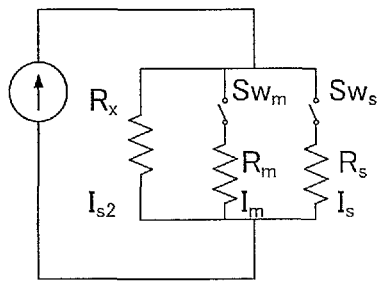

$Sw_s$: SWITCH LATER THAN USUAL
⇓
ENSURE HEATING TIME

SWITCHING ELECTRODE AND RESISTANCE WELDING DEVICE USING SAME, SPOT WELDING DEVICE AND SPOT WELDING METHOD

TECHNICAL FIELD

The present invention relates to a switching electrode and a resistance welding device using the switching electrode. More particularly, the invention relates to a switching electrode that is used in a switch which includes a pair of electrodes, brings the pair of electrodes into surface contact with each other to carry a current, and separates the pair of electrodes to cut off the current and a resistance welding device using the switching electrode.

In addition, the invention relates to a spot welding device and a spot welding method. More particularly, the invention relates to a spot welding device and a spot welding method that weld a work in which a plate with a minimum thickness is arranged on the outermost side.

BACKGROUND ART

In the related art, spot welding (which is also referred to as "resistance welding") has been used to join a work obtained by overlapping a plurality of plates. In spot welding, the overlapped work is interposed between a pair of electrode tips and is then pressed by the pair of electrode tips and a current flows between the electrode tips, with the pressure maintained at a predetermined value or more. Then, a work material is melted by Joule heat which is generated by the current and a nugget, which is a piece of molten material of the plates, is generated at the interface between the plates between the electrode tips. Then, the application of the current is stopped while the pressing state is maintained. Then, the nugget is cooled and solidified and the plates are welded.

In the spot welding, in some cases, three or more plates overlap each other and welding is performed on the plates. In this case, the thicknesses of the plates may not be equal to each other. In general, the plates have different thicknesses. For example, in the field of metal plates which are used in vehicles, a work is used which includes a laminate of a plurality of thick and hard metal plates and thin and soft metal plates that are stacked on the outside of the laminate. In the work, the interface between the plate which is the thinnest and is disposed on the outermost side (hereinafter, referred to as the "thinnest plate" in some cases) and the plate adjacent to the thinnest plate is disposed in the vicinity of the outside of the work. Therefore, when welding is performed so that the nugget is generated around the center of the work, the nugget is not sufficiently grown at the interface between the thinnest plate and the adjacent plate and it is difficult to sufficiently join the thinnest plate and the adjacent plate.

In recent years, in order to solve the problems, a spot welding device has been proposed which includes a pair of electrode tips that holds a work between them and an auxiliary electrode tip that comes into contact with the thinnest plate (for example, see Patent Documents 1 and 2). In the spot welding device, the welding electrode tip and the auxiliary electrode tip come into contact with the thinnest plate and a current flows between the electrode tips to heat the vicinity of the outside of the work. Therefore, it is possible to heat the work from the vicinity of the center to the vicinity of the outside and to appropriately weld the work including the thinnest plate.

In resistance welding (which is a synonym of "spot welding"), in some cases, a current is branched at a predetermined ratio and one of the branched currents is cut off by a switch. For example, when the resistance welding is applied to the spot welding device, while a current is flowing between the pair of electrode tips having the work interposed between them and between the welding electrode tip and the auxiliary electrode tip, the current which flows between the welding electrode tip and the auxiliary electrode tip is cut off by the switch to change the position where the welded portion is formed during the resistance welding. A switch may be used as the switch which simply brings two electrodes into contact with each other to carry a current and separates the two electrodes to cut off the current.

However, a large amount of current flows in the resistance welding. Therefore, when the current is cut off, a spark is likely to occur on the surface of the electrode of the switch and the surface of the electrode of the switch is damaged whenever the spark occurs. When the surface of the electrode is damaged, the contact area between the electrodes is changed and the resistance value of the switch is also changed. As a result, a stable current does not flow. A spark prevention mechanism can be provided in order to prevent the occurrence of the spark. However, when a large amount of current flows for resistance welding, it is difficult to completely suppress the occurrence of the spark with the spark prevention mechanism.

In order to prevent the surface of the electrode from being worn, the following electrode has been used (for example, see Patent Document 3): a silver-plated layer is formed on the surface of the electrode; graphite powder is injected to the silver-plated layer at a high speed; the surface of the silver-plated layer is melted by heat generated by the injection; and the graphite powder is stacked onto the surface of the molten silver-plated layer to form a graphite lubrication layer on the electrode.

Patent Document 1: Japanese Unexamined Patent Application, Publication No. 2011-194464

Patent Document 2: Japanese Unexamined Patent Application, Publication No. 2012-11398

Patent Document 3: Japanese Unexamined Patent Application, Publication No. 2009-245684

DISCLOSURE OF THE INVENTION

Problems to be Solved by the Invention

However, when the switching electrode for cutting off the resistance welding current is smoothed by, for example, plating in order to prevent the surface of the electrode from being worn due to the occurrence of sparks, a variation in the resistance value of the electrode due to the repeated cutoff of the current increases as the surface of the electrode becomes smoother. That is, for example, the plating of the surface of the electrode makes it possible to reduce the resistance value of the electrode at the beginning of use. However, when the current is repeatedly cut off tens of thousands of times, it is difficult to prevent damage to the surface of the electrode.

In some cases, even in the spot welding device including the auxiliary electrode tip, it may be difficult to appropriately weld the thinnest plate depending on the state of the work to be welded.

For example, when the electrode tip comes into contact with the work obliquely, the generated nugget is inclined as compared to when the electrode tip comes into vertical contact with the work. When the nugget is inclined, it is difficult to sufficiently cover the interface between the thinnest plate which is disposed in the vicinity of the outside of the work and the plate adjacent to the thinnest plate with the nugget. Therefore, it is difficult to appropriately weld the thinnest plate.

In addition, when there is a contact portion between the plates other than the welding portion in the work, a current flows to the contact portion and the amount of current to flow to the auxiliary electrode tip is reduced. As a result, a sufficient nugget is not generated at the interface between the thinnest plate and the plate adjacent to the thinnest plate and it is difficult to appropriately weld the thinnest plate.

The invention has been made in view of the above-mentioned problems and an object of the invention is to provide a switching electrode which has a small variation in resistance value even when a large amount of current is repeatedly cut off and can carry a stable amount of current even when it is continuously used and a resistance welding device using the switching electrode (first object).

Another object of the invention is to provide a spot welding device and a spot welding method which appropriately weld the thinnest plate that is provided on the outside of a work (second object).

Means for Solving the Problems

In order to achieve the first object, the invention provides a switching electrode that is used in a switch which includes a pair of electrodes, brings the pair of electrodes into surface contact with each other to carry a current, and separates the pair of electrodes to cut off the current. In the switching electrode according to the invention, at least one of contact surfaces of the pair of electrodes (for example, a first switching electrode tip 21 and a second switching electrode tip 22 which will be described below) is a flat surface having an uneven portion.

In the related art, for example, plating is performed on the surface of the electrode in order to prevent the surface of the electrode from being damaged or worn due to the occurrence of sparks. In the invention, the electrodes used in the switch come into surface contact with each other and unevenness processing is performed on the contact surface.

The damage of the surface of the electrode due to the occurrence of sparks is allowed and unevenness processing is performed on the contact surfaces of the electrodes. According to this structure, it is possible to provide a pair of switching electrodes which have little change in the contact area between the switching electrodes and have a small variation in resistance value even when the switch repeatedly cuts off the current.

In the switching electrode according to the invention, a surface roughness (Ra) of the flat surface may preferably be in the range of from 60 µm to 150 µm.

In the invention, when the surface roughness (Ra) of one of the contact surfaces of the pair of switching electrodes which has been subjected to unevenness processing is in the above-mentioned range, it is possible to further reduce the change in the resistance value of the switching electrode due to the repeated cutoff of the current.

In the switching electrode according to the invention, a contact area ratio of the contact surfaces of the pair of electrodes may be in the range of from 10% to 90%.

In the invention, when the contact area ratio of the contact surfaces of the pair of switching electrodes is in the range of from 10% to 90%, it is possible to further reduce the change in the resistance value of the switching electrode due to the repeated cutoff of the current.

In addition, the invention provides a resistance welding device (for example, a spot welding device 1 which will be described below) that performs resistance welding on a work (for example, a work W which will be described below) formed by overlapping a plurality of plates (for example, plates W1, W2, and W3 which will be described below). The resistance welding device includes: a first welding electrode (for example, a welding electrode tip 121 which will be described below) that comes into contact with one surface of the work; a second welding electrode (for example, a main current-carrying electrode tip 131 which will be described below) that comes into contact with the work from a side opposite to the first welding electrode and has a polarity opposite to a polarity of the first welding electrode; an auxiliary electrode (for example, an auxiliary current-carrying electrode tip 122 which will be described below) that comes into contact with the work from the same side as the first welding electrode and has a polarity opposite to the polarity of the first welding electrode; and a current-carrying means (for example, a control device 100, a power supply 30, and a switch 20 which will be described below) that carries a main current between the first welding electrode and the second welding electrode, with the work being interposed and pressed among the first welding electrode, the second welding electrode, and the auxiliary electrode, and carries a branch current between the first welding electrode and the auxiliary electrode, and cuts off the branch current using a switch including the switching electrode according to the invention.

Since the switching electrode, which has a small variation in the resistance value due to the repeated cutoff of the current, is used, it is possible to provide a resistance welding device which can stably join the plates even when it is continuously used.

In order to achieve the second object, the invention provides a spot welding device that welds a work (for example, a work W which will be described below) which is formed by overlapping three or more plates (for example, a thinnest plate W1, a plate W2, and a plate W3 which will be described below) and in which the thinnest plate (for example, the thinnest plate W1 which will be described below) with a minimum thickness among the plates is arranged on the outermost side. The spot welding device (for example, a spot welding device 1 which will be described below) according to the invention includes: a welding electrode (for example, a welding electrode tip 121 which will be described below) that comes into contact with the thinnest plate; an auxiliary current-carrying electrode (for example, an auxiliary current-carrying electrode tip 122 which will be described below) that comes into contact with the thinnest plate and has a polarity opposite to a polarity of the welding electrode; a main current-carrying electrode (for example, a main current-carrying electrode tip 131 which will be described below) that holds the work together with the welding electrode and the auxiliary current-carrying electrode so as to be interposed between them and has a polarity opposite to the polarity of the welding electrode; and an auxiliary current control means (for example, a control device 100 which will be described below) that detects a state (for example, a contact angle or an auxiliary current value which will be described below) of the auxiliary current-carrying electrode and controls a current which flows through a current path connecting the welding electrode and the auxiliary current-carrying electrode on the basis of the detected state.

As such, the spot welding device according to the invention controls the current which flows to the auxiliary current-carrying electrode for welding the thinnest plate on the basis of the state of the auxiliary current-carrying electrode, unlike the spot welding device according to the related art which simply applies the current to the auxiliary current-carrying electrode. Therefore, the current which flows to the auxiliary current-carrying electrode can vary depending on the state of the auxiliary current-carrying electrode (that is, the state of the work) and it is possible to appropriately weld the thinnest plate regardless of the state of the work.

In this case, the contact angle of the welding electrode and the auxiliary current-carrying electrode with the thinnest plate (for example, the contact angle θ of a spot welding gun 10 with respect to the work W which will be described below) may be used as the state of the auxiliary current-carrying electrode.

In this case, when the welding electrode and the auxiliary current-carrying electrode come into contact with the thinnest plate obliquely, a different current can flow to the auxiliary current-carrying electrode. Therefore, it is possible to grow the nugget which has not been capable of sufficiently covering the interface between the thinnest plate and an adjacent plate due to inclination in the related art and thus to appropriately weld the thinnest plate. Here, the contact angle of the welding electrode and the auxiliary current-carrying electrode with respect to the thinnest plate can be calculated from, for example, the difference between the amount of movement of the welding electrode which is moved in order to come into contact with the thinnest plate (for example, the amount of movement of a rod 12 which will be described below) and the amount of movement of the auxiliary current-carrying electrode which is moved in order to come into contact with the thinnest plate (for example, the amount of movement of a rod 12 which will be described below + the amount of movement of a moving means which will be described below).

In addition, the value of the current which flows to the auxiliary current-carrying electrode may be used as the state of the auxiliary current-carrying electrode. Here, when there is a contact portion between the plates other than the welding portion in the work, the current which flows from the welding electrode to the auxiliary current-carrying electrode is reduced. Therefore, the spot welding device according to the invention measures the current value of the auxiliary current-carrying electrode to detect the contact state in the work.

As a result, it is possible to control the current which flows to the auxiliary current-carrying electrode on the basis of the contact state of the work which cannot be determined from the outward appearance and thus to appropriately weld the thinnest plate.

The invention provides a spot welding method that welds a work (for example, a work W which will be described below) which is formed by overlapping three or more plates (for example, a thinnest plate W1, a plate W2, and a plate W3 which will be described below) and in which the thinnest plate with a minimum thickness among the plates is arranged on an outermost side. The spot welding method includes: a step of bringing a welding electrode (for example, a welding electrode tip 121 which will be described below) and an auxiliary current-carrying electrode (for example, an auxiliary current-carrying electrode tip 122 which will be described below) having a polarity opposite to a polarity of the welding electrode into contact with the thinnest plate and bringing a main current-carrying electrode (for example, a main current-carrying electrode tip 131 which will be described below) having a polarity opposite to the polarity of the welding electrode into contact with a side opposite to the thinnest plate to interpose the work between the electrodes; and a step of detecting a state (for example, a contact angle or an auxiliary current value which will be described below) of the auxiliary current-carrying electrode and controlling a current which flows through a current path connecting the welding electrode and the auxiliary current-carrying electrode on the basis of the detected state.

In this case, the contact angle of the welding electrode and the auxiliary current-carrying electrode with respect to the thinnest plate or the value of the current which flows to the auxiliary current-carrying electrode may be used as the state of the auxiliary current-carrying electrode.

The spot welding method has the same effect as the spot welding device.

Effects of the Invention

According to the invention, it is possible to provide a switching electrode which has a small variation in resistance value even when a large amount of current is repeatedly cut off and can allow a stable amount of current to flow even when it is continuously used. In addition, it is possible to provide a resistance welding device which can stably join plates even when it is continuously used.

Furthermore, according to the invention, it is possible to appropriately weld the thinnest plate which is provided on the outside of a work.

BRIEF DESCRIPTION OF THE DRAWINGS

FIG. 7 is a diagram illustrating the outline of the auxiliary current control of the spot welding device according to the embodiment on the basis of the contact angle with respect to a work.

FIG. 9 is a diagram illustrating the details of the auxiliary current control of the spot welding device according to the embodiment.

EXPLANATION OF REFERENCE NUMERALS

1 SPOT WELDING DEVICE
10 SPOT WELDING GUN
20 SWITCH (CURRENT-CARRYING MEANS)
21 FIRST SWITCHING ELECTRODE TIP
22 SECOND SWITCHING ELECTRODE TIP
30 POWER SUPPLY (CURRENT-CARRYING MEANS)
30A CURRENT SOURCE

100 CONTROL DEVICE (CURRENT-CARRYING MEANS, AUXILIARY CURRENT CONTROL MEANS)
12 ROD
120A MOVABLE ELECTRODE UNIT
121 WELDING ELECTRODE TIP (FIRST WELDING ELECTRODE, WELDING ELECTRODE)
122 AUXILIARY CURRENT-CARRYING ELECTRODE TIP (AUXILIARY ELECTRODE, AUXILIARY CURRENT-CARRYING ELECTRODE)
13 C-TYPE YOKE
130A FIXED ELECTRODE UNIT
131 MAIN CURRENT-CARRYING ELECTRODE TIP (SECOND WELDING ELECTRODE, MAIN CURRENT-CARRYING ELECTRODE)
W WORK

PREFERRED MODE FOR CARRYING OUT THE INVENTION

First Embodiment

Hereinafter, an embodiment of the invention will be described with reference to the drawings.

Figure 1:
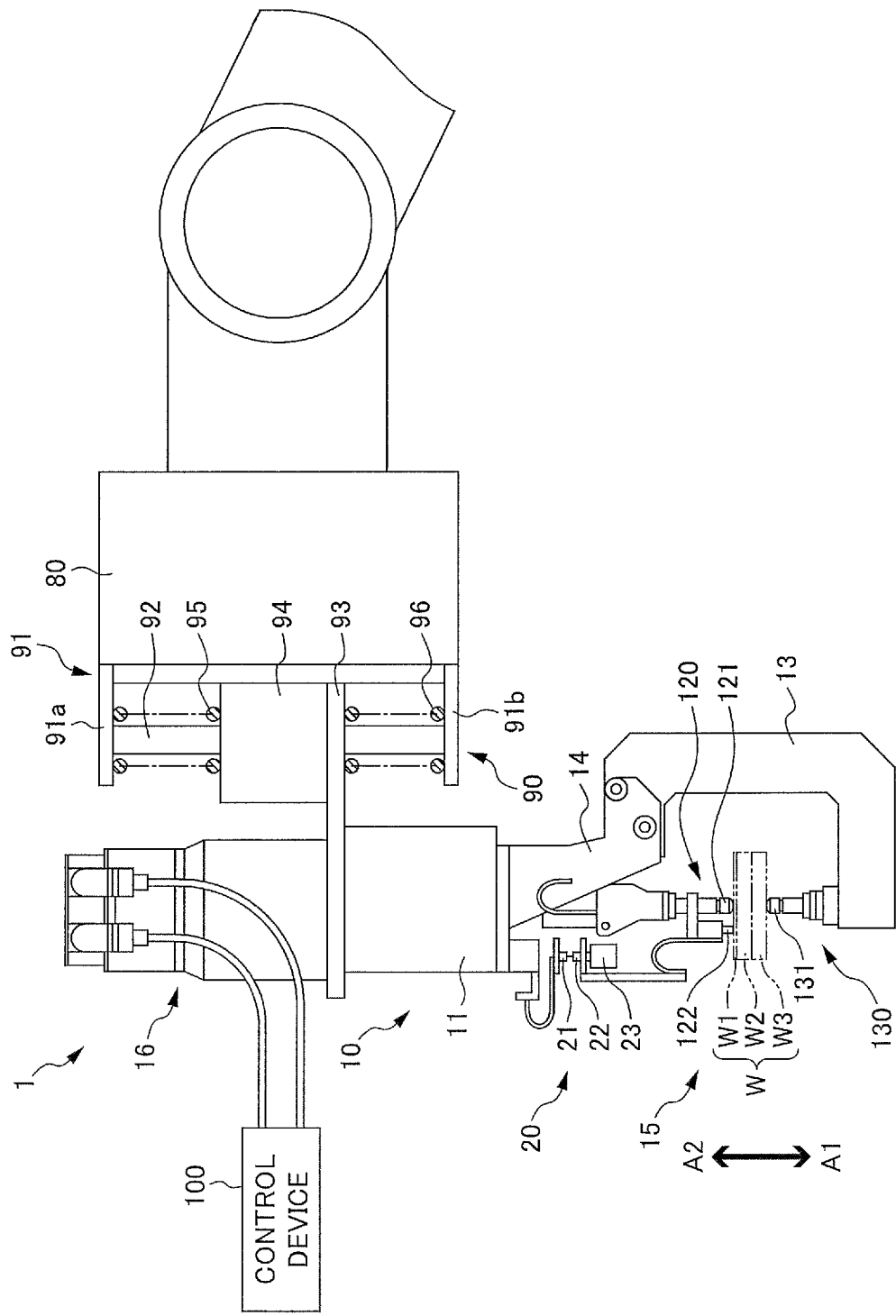
FIG. 1 is a side view illustrating the structure of a spot welding device using a switch including a set of switching electrodes according to an embodiment of the invention.

FIG. 1 is a side view illustrating the structure of a spot welding device using a switch including the set of switching electrodes according to an embodiment of the invention. A spot welding device 1 is an electric-powered spot welding device which is attached to the leading end of a robot arm 80.

The spot welding device 1 interposes a work W obtained by overlapping a plurality of plates W1 (thin plate), W2 (thick plate), and W3 (thick plate) between a plurality of electrodes, which will be described below, applies pressure to the work W, and applies a voltage between the electrodes in this state to weld the work W.

The spot welding device 1 includes a spot welding gun 10 that is supported by a supporting portion 90 provided at the leading end of the robot arm 80 and a control device 100 that controls the spot welding gun 10.

The supporting portion 90 includes a supporting bracket 91. The supporting bracket 91 includes an upper plate 91a and a lower plate 91b that is parallel to the upper plate 91a. A guide bar 92 is provided as a bridge between the upper plate 91a and the lower plate 91b.

A supporting plate 93 is attached to the guide bar 92 so as to be slidable in the axis direction of the guide bar 92. The supporting plate 93 extends from the robot arm 80 parallel to the upper plate 91a and the lower plate 91b and supports the spot welding gun 10 at the leading end thereof. A box-shaped support 94 is provided on the base end side of the upper surface of the supporting plate 93. A first coil spring 95 which is wound around the guide bar 92 is interposed between the upper plate 91a and the support 94. Similarly, a second coil spring 96 which is wound around the guide bar 92 is interposed between the lower plate 91b and the supporting plate 93.

The spot welding gun 10 is supported by the supporting plate 93 and can move up and down relative to the supporting portion 90. The spot welding gun 10 includes a welding gun body 11, a welding electrode unit 15 that is provided at the leading end of the welding gun body 11, and a power supply 30 that serves as a current source, which will be described below.

The welding gun body 11 includes a servomotor 16 that is provided in its upper part and a feed screw mechanism (not illustrated) that is connected to the servomotor 16.

The welding electrode unit 15 includes a movable electrode unit 120 and a fixed electrode unit 130.

The movable electrode unit 120 protrudes downward from the leading end of the welding gun body 11 and is supported by the leading end of a rod 12 which is connected to the feed screw mechanism. The rod 12 is moved up and down by the servomotor 16 via the feed screw mechanism (in an A2 direction or an A1 direction of FIG. 1) to advance and retract the movable electrode unit 120 to and from the fixed electrode unit 130, which will be described below.

The fixed electrode unit 130 is supported by the leading end of a C-type yoke 13 that extends downward from a connection portion 14 connected to the leading end of the welding gun body 11.

The movable electrode unit 120 and the fixed electrode unit 130 face each other with the work W interposed between them. The movable electrode unit 120 includes a welding electrode tip 121 and an auxiliary current-carrying electrode tip 122. The fixed electrode unit 130 includes a main current-carrying electrode tip 131. The work W is interposed among the welding electrode tip 121, the auxiliary current-carrying electrode tip 122, and the main current-carrying electrode tip 131 and is pressed by them.

A switch 20 includes a first switching electrode tip 21, a second switching electrode tip 22, and a cylinder mechanism 23. The first switching electrode tip 21 is attached to the welding gun body 11. The cylinder mechanism 23 is attached to the second switching electrode tip 22. The first switching electrode tip 21 is fixed and the second switching electrode tip 22 can be vertically driven by the cylinder mechanism 23. A current flows when the second switching electrode tip 22 is driven to come into contact with the first switching electrode tip 21. The current is cut off when the second switching electrode tip 22 is driven to be separated from the first switching electrode tip 21.

Figure 2:
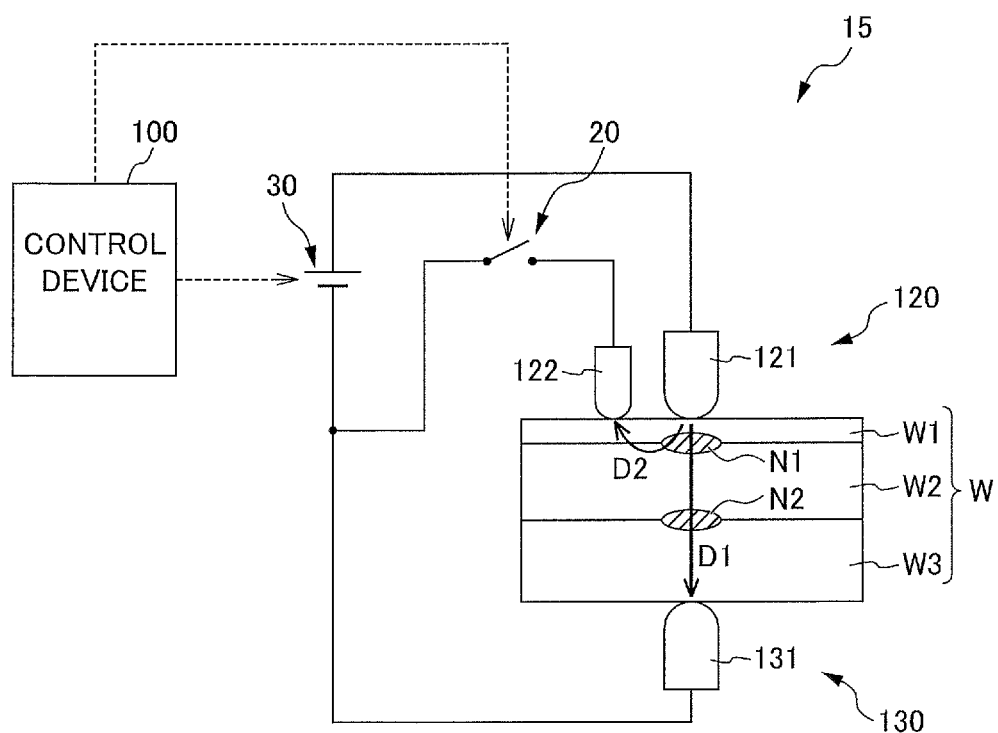
FIG. 2 is a diagram illustrating the structure of the electrode unit of the spot welding device.

FIG. 2 is a diagram illustrating the structure of the welding electrode unit 15 of the spot welding device 1.

The leading end surfaces of the welding electrode tip 121 and the auxiliary current-carrying electrode tip 122 of the movable electrode unit 120 are substantially flush with each other.

The welding electrode tip 121 and the auxiliary current-carrying electrode tip 122 are provided with a predetermined gap between them and are arranged along the surface direction of the work W. The electrode tips have a cylindrical shape and the leading end of the welding electrode tip 121 has a dome shape.

The main current-carrying electrode tip 131 of the fixed electrode unit 130 is arranged so as to face the welding electrode tip 121, with the work W interposed between them. The main current-carrying electrode tip 131 has a cylindrical shape and the leading end thereof has a dome shape.

The power supply 30 is connected to the welding electrode unit 15 having the above-mentioned structure. Specifically, as illustrated in FIG. 2, the positive electrode of the power supply 30 is connected to the welding electrode tip 121 and the negative electrode thereof is connected to the main current-carrying electrode tip 131 and the auxiliary current-carrying electrode tip 122.

Therefore, a welding current which flows from the power supply 30 to the work W through the welding electrode tip 121 flows through a current path D1 to the main current-carrying electrode tip 131 and a current path D2 to the auxiliary current-carrying electrode tip 122 and returns to the power supply 30 through the main current-carrying electrode tip 131 and the auxiliary current-carrying electrode tip 122.

As illustrated in FIG. 2, when the welding current flows through the current path D1 and the current path D2, the current density of the interface between W1 and W2 is higher than the current density of the interface between W2 and W3 in the thickness direction between the welding electrode tip 121 and the main current-carrying electrode tip 131. In general, when resistance welding is performed on a work obtained by overlapping a thin plate, a thick plate, and a thick plate in this order, the heat of fusion is more likely to be generated between the thick plate and the thick plate than between the thin plate and the thick plate. However, when the electrodes are arranged as illustrated in FIG. 2, it is possible to effectively melt and join the thin plate and the thick plate which are difficult to join using resistance welding in the related art, since the current density of the interface between the thin plate and the thick plate is higher than the current density of the interface between the thick plate and the thick plate.

The switch 20 is provided between the auxiliary current-carrying electrode tip 122 and the negative electrode of the power supply 30. When resistance welding is performed on the work W illustrated in FIG. 2, the current is branched and flows to the current path D1 and the current path D2 at the beginning of the application of the voltage and a nugget N1 is grown at the interface between W1 and W2 in the thickness direction between the welding electrode tip 121 and the main current-carrying electrode tip 131. After the nugget N1 is sufficiently grown, the current is cut off by the switch 20. Then, the current flows only through the current path D1 in the work and a nugget N2 is grown at the interface between W2 and W3. Since the current is cut off by the switch 20, it is possible to grow the nugget N1 and the nugget N2 with good balance. Therefore, it is possible to obtain a joint part with high joint strength. The power supply 30 and the switch 20 are controlled by the control device 100. FIG. 2 illustrates the state immediately after resistance welding starts. Therefore, in FIG. 2, the nuggets N1 and N2 are not sufficiently grown.

Returning to FIG. 1, the servomotor 16 is controlled by the control device 100.

Next, the operation of the spot welding device 1 according to this embodiment will be described.

First, with the movable electrode unit 120 separated from the fixed electrode unit 130, the robot arm 80 and the supporting portion 90 are operated to move the spot welding gun 10 to the welding portion of the work W. Specifically, the spot welding gun 10 is moved to the position where the leading end surface of the main current-carrying electrode tip 131 of the fixed electrode unit 130 comes into contact with the lower surface of the welding portion of the work W.

Then, the control device 100 controls the servomotor 16 so that the movable electrode unit 120 is moved to the work W by the operation of the feed screw mechanism. Then, the leading end surfaces of the welding electrode tip 121 and the auxiliary current-carrying electrode tip 122 come into contact with the upper surface of the work W.

Then, the control device 100 controls the power supply 30 so that the welding current is supplied, while pressing the work W with the welding electrode tip 121, the auxiliary current-carrying electrode tip 122, and the main current-carrying electrode tip 131. Then, the welding current flows from the welding electrode tip 121 to the main current-carrying electrode tip 131 through the current path D1. In addition, the welding current flows from the welding electrode tip 121 to the auxiliary current-carrying electrode tip 122 through the current path D2. Then, the melting of the work material is most accelerated at the interface between W1 and W2, at which the current density is high and to which the largest amount of heat is input, in the thickness direction between the welding electrode tip 121 and the main current-carrying electrode tip 131. As a result, the nugget N1 is generated.

Then, the control device 100 controls the switch 20 so that the supply of the welding current through the current path D2 is stopped. Then, the current which flows through the work W is only the welding current which flows through the current path D1. Therefore, the largest amount of heat is input to the interface between W2 and W3 in the thickness direction between the welding electrode tip 121 and the main current-carrying electrode tip 131 and the nugget N2 is grown. As a result, the melting of the work material progresses.

Then, the control device 100 controls the power supply 30 so that the supply of the welding current is stopped. Then, the nugget is cooled and solidified and the work W is welded.

Next, the switch 20 will be described.

As described above, the first switching electrode tip 21 and the second switching electrode tip 22 of the switch 20 come into contact with each other to carry a current and are separated from each other to cut off the current. The switch 20 cuts off the large amount of current used for resistance welding. Therefore, a spark occurs when the electrodes are separated from each other. When the current is cut off and a spark occurs, the surface of the electrode is damaged and worn, which is not preferable. A spark prevention mechanism may be provided in order to prevent the occurrence of the spark. However, when a large amount of current is supplied for resistance welding, it is difficult to completely suppress the occurrence of the spark with the spark prevention mechanism. In addition, for example, even for a plated electrode, when the electrode is repeatedly used thousands of times or tens of thousands of times in the resistance welding device, the surface of the electrode is worn. On the other hand, as the surface of the electrode becomes smoother at the beginning, the difference in resistance value between the switching electrode in the initial state and the switching electrode after it is repeatedly used increases. As a result, it is difficult to set the amount of current used for resistance welding. When it is difficult to set the amount of current used for resistance welding, it is also difficult to provide welded work material with stable quality.

In the invention, in order to minimize the difference in resistance value between the switching electrode in the initial state and the switching electrode after it is repeatedly used, the switching electrodes come into surface contact with each other and unevenness processing is performed on the contact surface between the electrodes to allow the occurrence of a spark when the current is cut off. That is, when the unevenness processing is performed on the surface of the electrode at the beginning, it is possible to suppress an increase or decrease in the contact area between the switching electrodes due to damage even though the surface of the electrode is damaged due to the spark that occurs at the time the current is cut off. Therefore, the influence of the switching electrode on the resistance value is reduced.

A pair of switching electrodes come into surface contact with each other for the following reason. When the surfaces of the electrodes have a given contact area, the influence of the spark, which occurs when the current is cut off, on the increase or decrease in the contact area between the electrodes is reduced.

The shape of the switching electrodes is not particularly limited as long as the switching electrodes come into surface contact with each other. In the switching electrode, the surface which has been subjected to the unevenness processing is a flat surface and the surface which comes into contact with the surface subjected to the unevenness processing is also a flat surface.

The unevenness processing for the surface of the switching electrode may be performed on one of the switching electrodes or it may be performed on both the switching electrodes. In the structure which performs the unevenness processing on both the switching electrodes, the influence of the repeated cutoff of the current on the increase or decrease in the contact area between the switching electrodes tends to be less than that in the structure which performs the unevenness processing on one of the switching electrodes.

An uneven portion of the surface of the switching electrode can be formed by, for example, blast processing or machine processing. However, the method for forming the uneven portion is not particularly limited. The switching electrode is made of any conductive material. In particular, the switching electrode is preferably made of alumina-dispersed copper.

Preferably, one of the contact surfaces of the pair of switching electrodes which has the uneven portion formed therein has a surface roughness (Ra) of from 60 μm to 150 μm. When the surface roughness (Ra) of the switching electrode is less than 60 μm, the change in the contact area between the electrodes due to the repeated cutoff of the current tends to increase. When the surface roughness (Ra) is greater than 150 μm, the resistance of the switching electrode increases and the amount of branch current during resistance welding tends to decrease.

The surface roughness (Ra) of the switching electrode can be measured by a general surface roughness measurement device.

Preferably, the contact area ratio of the contact surfaces of the pair of switching electrodes according to the invention is in the range of from 10% to 90%. When the contact area ratio of the contact surfaces of the pair of switching electrodes is greater than 90%, the change in the contact area between the electrodes due to the repeated cutoff of the current tends to increase. When the contact area ratio is less than 10%, the resistance of the switching electrode increases and the amount of branch current during resistance welding tends to decrease.

A current of from 2 kA to 4 kA was repeatedly cut off using a pair of switch electrodes with a contact area ratio of 21% and the change in the contact area ratio was examined. As a result, the contact area ratio was 65% after 30,000 strokes and was 73% after 90,000 strokes. When the contact area ratio of the contact surfaces of the pair of switching electrodes is in the range of from 10% to 90%, considering a variation in the measurement result, the measurement result shows that the change in the contact area between the electrodes due to the repeated cutoff of the current tends to decrease.

The contact area ratio of the contact surfaces of the pair of switching electrodes is measured using pressure-sensitive paper. First, the pressure-sensitive paper is interposed between the pair of switching electrodes and is pressed at general pressure while a current is being applied. Then, the pair of switching electrodes is separated from each other and the area of the colored portion of the pressure-sensitive paper is measured. The ratio of the area of the colored portion of the pressure-sensitive paper to the area of the contact surface of the pair of switching electrodes is the contact area ratio of the contact surfaces of the pair of switching electrodes.

Next, the influence of the repeated cutoff of the current on the resistance value of the switching electrode will be described with reference to FIGS. 3 and 4.

Figure 3:
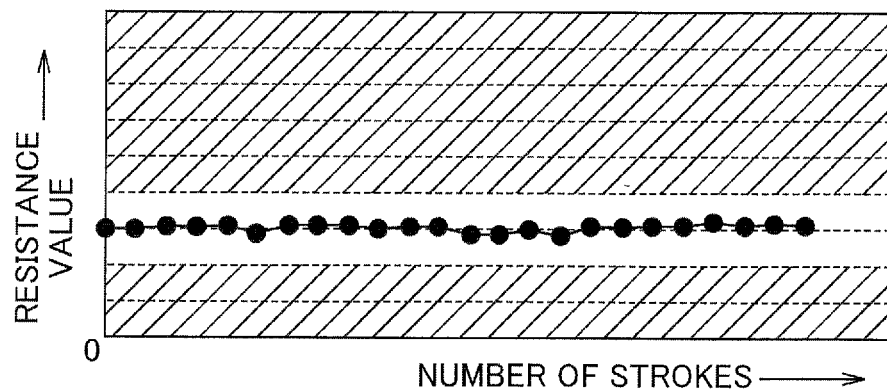
FIG. 3 is a diagram illustrating the variation in the resistance value of the switching electrode according to the invention due to the repeated cutoff of the current.

FIG. 3 illustrates an example of the use of the pair of switching electrodes according to the invention. As an example of the pair of switching electrodes according to the invention, the following pair of electrodes are used: cylindrical switching electrodes with a diameter of 16 mm are used; the surface of one of the switching electrodes which comes into contact with the other switching electrode is a flat surface; blast processing is performed on the surface of the one switching electrode which comes into contact with the other switching electrode so that the surface roughness (Ra) of the surface is 60 μm; and the contact area ratio of the contact surfaces of the switching electrodes is adjusted to 21%. The electrodes were made of alumina-dispersed copper and a current of from 2 kA to 4 kA was repeatedly cut off.

As can be seen from FIG. 3, there is little variation in the resistance values of the pair of switching electrodes according to the invention due to the repeated cutoff of the current.

Figure 4:
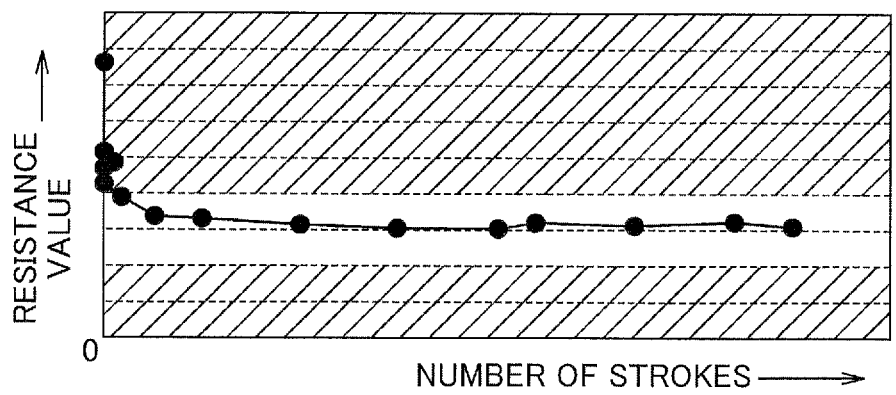
FIG. 4 is a diagram illustrating the variation in the resistance value of a switching electrode according to the related art due to the repeated cutoff of the current.

FIG. 4 illustrates an example of the use of the switching electrodes according to the related art. The following pair of electrodes are used as the switching electrodes according to the related art: one switching electrode has a cylindrical shape with a diameter of 16 mm and has a flat surface that comes into contact with the other switching electrode; and the other switching electrode has a cylindrical shape with a diameter of 16 mm and a dome-shaped surface that comes into contact with the one switching element (the leading end of the electrode has a curved shape of R100 in side view). The electrodes were made of alumina-dispersed copper and a current of from 2 kA to 4 kA was repeatedly cut off.

As can be seen from FIG. 4, immediately after the switching electrode according to the related art is used to cut off the current, the resistance value is rapidly reduced. When the cutoff of the current is repeated, the resistance value is stabilized. The reason is considered to be as follows: when the cutoff of the current is repeated, the leading end of the electrode having the dome-shaped surface that comes into contact with the other switching electrode is worn and the area of the contact surface between the switching electrodes increases.

In the above-described embodiment, the pair of switching electrodes according to the invention is used in the spot welding device. However, the use of the pair of switching electrodes according to the invention is not limited thereto. For example, the pair of switching electrodes may also be used in a resistance welding device that is not used for spot welding, but is used for resistance welding. In addition, the pair of switching electrodes may be used in all types of switches that switch the flow of the current and devices including the switches.

The invention is not limited to the above-described embodiment and various changes and modifications of the invention within the scope and spirit of the invention are included in the invention.

Second Embodiment

Next, another embodiment of the invention will be described with reference to FIGS. 5 to 9.

[Structure of Spot Welding Device 1]

Figure 5:
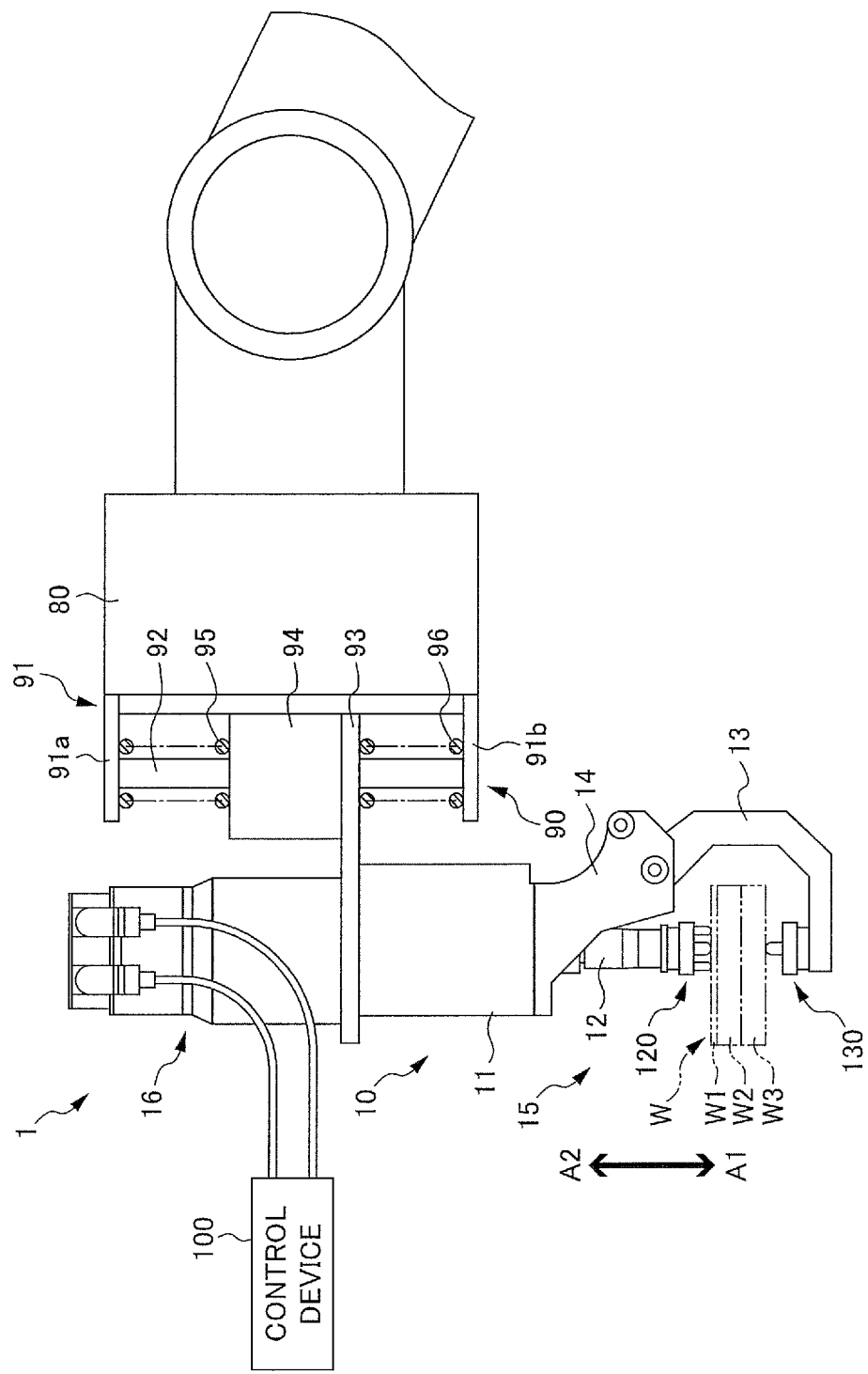
FIG. 5 is a side view illustrating the structure of a spot welding device according to an embodiment of the invention.

FIG. 5 is a side view illustrating the structure of a spot welding device according to an embodiment of the invention. A spot welding device 1 according to this embodiment is an electric-powered spot welding device that is attached to the leading end of a robot arm 80.

The spot welding device 1 interposes a work W obtained by overlapping a plurality of plates between a plurality of electrodes, which will be described below, applies pressure to the work W, and applies a voltage between the electrodes in this state to weld the work W. The spot welding device 1 according to this embodiment includes three or more plates and is suitably used to weld the work W in which the thinnest plate is arranged on the outermost side. In this embodiment, a work W in which a thinnest plate W1, a plate W2 (thick plate), and a plate W3 (thick plate) are arranged in this order from the upper side is used as an example of the work W.

The spot welding device 1 includes a spot welding gun 10 that is supported by a supporting portion 90 provided at the leading end of the robot arm 80 and a control device 100 that controls the spot welding gun 10.

The supporting portion 90 includes a supporting bracket 91. The supporting bracket 91 includes an upper plate 91*a* and a lower plate 91*b* that is parallel to the upper plate 91*a*. A guide bar 92 is provided as a bridge between the upper plate 91*a* and the lower plate 91*b*.

A supporting plate 93 is attached to the guide bar 92 so as to be slidable in the axis direction of the guide bar 92. The supporting plate 93 extends from the robot arm 80 parallel with the upper plate 91*a* and the lower plate 91*b* and supports the spot welding gun 10 at the leading end thereof. A box-shaped support 94 is provided on the base end side of the upper surface of the supporting plate 93. A first coil spring 95 which is wound around the guide bar 92 is interposed between the upper plate 91*a* and the support 94. Similarly, a second coil spring 96 which is wound around the guide bar 92 is interposed between the lower plate 91*b* and the supporting plate 93.

The spot welding gun 10 is supported by the supporting plate 93 and can move up and down relative to the supporting portion 90. The spot welding gun 10 includes a welding gun body 11, a welding electrode unit 15 that is provided at the leading end of the welding gun body 11, and a current source 30A (see FIG. 6) that supplies a current to the welding electrode unit 15.

The welding gun body 11 includes a servomotor 16 that is provided in its upper part and a feed screw mechanism (not illustrated) that is connected to the servomotor 16.

The welding electrode unit 15 includes a movable electrode unit 120 and a fixed electrode unit 130.

The movable electrode unit 120 protrudes downward from the leading end of the welding gun body 11 and is supported by the leading end of a rod 12 which is connected to the feed screw mechanism. The rod 12 is moved up and down by the servomotor 16 via the feed screw mechanism (in an A2 direction or an A1 direction of FIG. 5) to advance and retract the movable electrode unit 120 to and from the fixed electrode unit 130, which will be described below. The amount of movement of the rod 12 is supplied to the control device 100 and is used for auxiliary current control, which will be described below.

The fixed electrode unit 130 is supported by the leading end of a C-type yoke 13 that extends downward from a connection portion 14 connected to the leading end of the welding gun body 11.

The movable electrode unit 120 and the fixed electrode unit 130 face each other with the work W interposed between them and come into contact with the work W. In the contact state, a voltage is applied to form a welding portion (hereinafter, referred to as a "nugget N") among the thinnest plate W1, the plate W2, and the plate W3.

Figure 6:
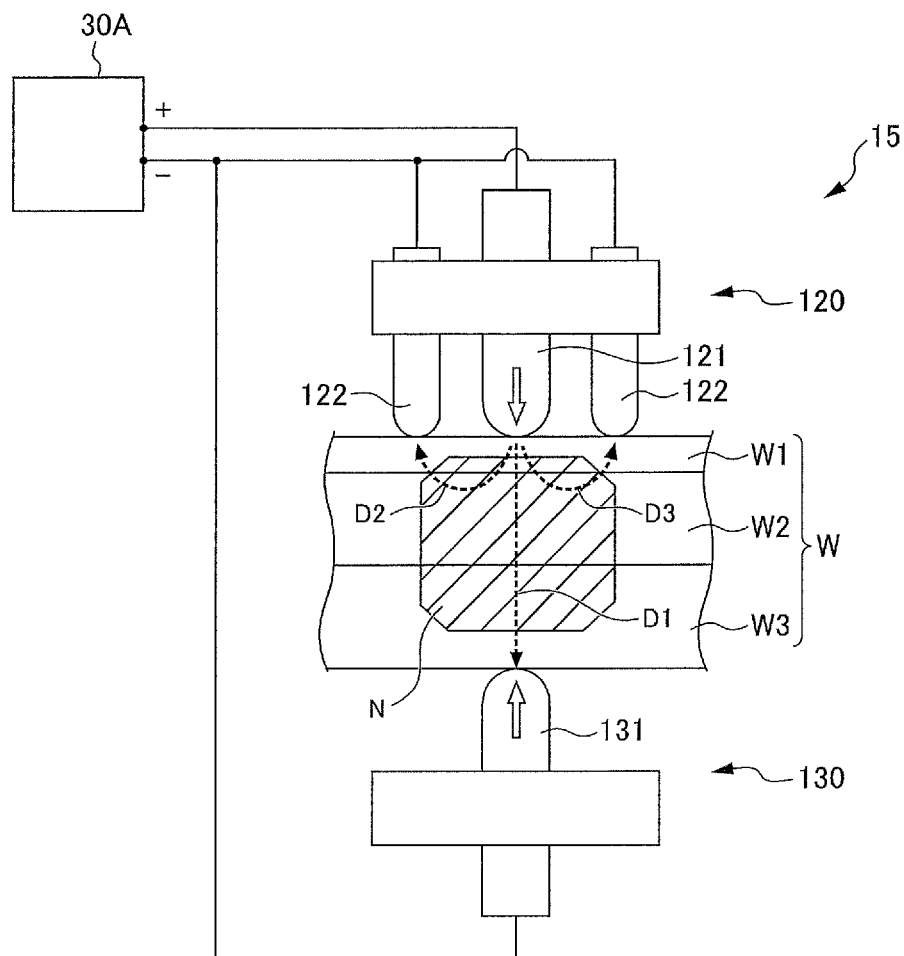
FIG. 6 is a diagram illustrating the structure of the electrode unit of the spot welding device according to the embodiment.

FIG. 6 is a diagram illustrating the structure of the welding electrode unit 15 of the spot welding device 1.

The movable electrode unit 120 includes a welding electrode tip 121 and auxiliary current-carrying electrode tips 122. A current flows between the welding electrode tip 121 and the auxiliary current-carrying electrode tips 122.

The welding electrode tip 121 and the auxiliary current-carrying electrode tips 122 have a cylindrical shape, have a dome-shaped leading end portion, and are arranged along the surface direction of the work W, with a predetermined gap between them. The leading end portions of the electrode tips are substantially flush with each other, are arranged so as to face the upper surface of the work W, and press the upper surface of the work W with the vertical movement of the rod 12 (see FIG. 5).

A moving means (not illustrated), which is, for example, an air cylinder, is provided in the auxiliary current-carrying electrode tip 122 and can move up and down independently of the rod 12. In addition, a movement amount measurement means, which is, for example, a laser displacement meter, is provided in the auxiliary current-carrying electrode tip 122 and can measure the amount of vertical movement of the moving means. Furthermore, an ammeter is provided in the auxiliary current-carrying electrode tip 122 and can measure the value of the current which flows from the welding electrode tip 121. The amount of movement measured by the movement amount measurement means and the current value measured by the ammeter are supplied to the control device 100 and are used for auxiliary current control, which will be described below.

The fixed electrode unit 130 includes a main current-carrying electrode tip 131 and a current flows between the main current-carrying electrode tip 131 and the welding electrode tip 121.

The main current-carrying electrode tip 131 has a cylindrical shape and the leading end portion thereof has a dome shape. The leading end portion of the main current-carrying electrode tip 131 is arranged so as to face the lower surface of the work W and presses the lower surface of the work W when the movable electrode unit 120 is vertically moved by the vertical movement of the rod 12 (see FIG. 5).

The current source 30A is connected to the movable electrode unit 120 and the fixed electrode unit 130 having the above-mentioned structure. Specifically, the welding electrode tip 121 is connected to the positive electrode of the current source 30A and the auxiliary current-carrying electrode tips 122 and the main current-carrying electrode tip 131 are connected to the negative electrode of the current source 30A.

The current source 30A includes a power supply and a variable resistor which are not illustrated and supplies a current to each electrode tip.

Therefore, the current which flows from the current source 30A to the work W through the welding electrode tip 121 flows through a current path D1 and returns to the current source 30A through the main current-carrying electrode tip 131. The current which flows through the current path D1 (hereinafter, referred to as a "main current" in some cases) heats a portion of the work W in the vicinity of the center in the thickness direction. Then, the nugget N is generated around the heated portion and the work W is welded.

The current which flows from the current source 30A to the work W through the welding electrode tip 121 flows through current paths D2 and D3 and returns to the current source 30A through the auxiliary current-carrying electrode tips 122. The current (hereinafter, referred to as an "auxiliary current" in some cases) which flows through the current paths D2 and D3 mainly heats the portion of the work W between the thinnest plate W1 that is arranged on the outermost side and the plate W2 and is used to weld the thinnest plate N1 that is arranged on the outermost side. That is, when the thinnest plate W1 is arranged on the outermost side, the interface between the thinnest plate W1 and the plate W2 is not disposed in the vicinity of the center of the work W in the thickness direction, but is disposed in the vicinity of the outside of the work W. As a result, in some cases, it is difficult to weld the thinnest plate W1 only with the main current which generates the nugget N in the vicinity of the center of the work W. Therefore, the auxiliary current-carrying electrode tips 122 are used to appropriately weld the thinnest plate W1 that is arranged on the outermost side.

In FIG. 6, two auxiliary current-carrying electrode tips 122 are provided. However, the number of auxiliary current-carrying electrode tips 122 is not limited to two. Only one auxiliary current-carrying electrode tip 122 may be provided or three or more auxiliary current-carrying electrode tips 122 may be provided as long as the outermost thinnest plate W1 can be welded. In addition, for example, a switch for electrically disconnecting the auxiliary current-carrying electrode tip 122 from the welding electrode tip 121 or a variable resistor for changing the auxiliary current that flows from the welding electrode tip 121 may be provided in the auxiliary current-carrying electrode tip 122, which will be described below.

Returning to FIG. 5, the control device 100 controls the servomotor 16 and the current source 30A. In addition, the control device 100 measures the state of the auxiliary current-carrying electrode tips 122 and controls the auxiliary current-carrying electrode tips 122 and the current source 30A on the basis of the measurement result, which will be described below. It is assumed that the state of the auxiliary current-carrying electrode tips 122 includes the amount of movement measured by the movement amount measurement means and the current value measured by the ammeter.

[Basic Operation of Spot Welding Device 1]

Next, the basis operation of the spot welding device 1 according to this embodiment will be described.

First, with the movable electrode unit 120 separated from the fixed electrode unit 130, the robot arm 80 and the supporting portion 90 are operated to move the spot welding gun 10 to a welding portion of the work W. Specifically, the spot welding gun 10 is moved to the position where the leading end portion of the main current-carrying electrode tip 131 of the fixed electrode unit 130 comes into contact with the lower surface of the welding portion of the work W.

Then, the control device 100 controls the servomotor 16 so that the movable electrode unit 120 is moved to the work W by the operation of the feed screw mechanism. Then, the leading end portions of the welding electrode tip 121 and the auxiliary current-carrying electrode tips 122 come into contact with the upper surface of the work W. In this case, when the spot welding gun 10 is inclined with respect to the work W, the leading end portions of the welding electrode tip 121 and the auxiliary current-carrying electrode tips 122 do not come into contact with the upper surface of the work W appropriately. Therefore, in this case, the control device 100 controls the moving means provided in the auxiliary current-carrying electrode tip 122 independently of the servomotor 16. According to this structure, even when the spot welding gun 10 is inclined with respect to the work W, it is possible to reliably bring the leading end portion of each electrode tip into contact with the upper surface of the work W.

The control device 100 advances the movable electrode unit 120 further towards the work W, with the leading end portion of each electrode tip coming into contact with the surface of the work W. Then, the work W is pressed by the leading end portion of each electrode tip and the plates forming the work W are electrically connected to each other by narrowing the gap between them.

Then, the control device 100 controls the current source 30A so that a current is supplied, while keeping the leading end portions of each electrode tip pressing against the work. Then, the main current flows from the welding electrode tip 121 to the main current-carrying electrode tip 131 through the current path D1 and the auxiliary current flows from the welding electrode tip 121 to the auxiliary current-carrying electrode tips 122 through the current paths D2 and D3. Then, the melting of the work material is accelerated in the range from the center of the work W in the thickness direction to an upper part in the thickness direction and the nugget N is generated.

Then, the control device 100 controls the current source 30A so that the supply of the current is stopped. The welding between the thinnest plate W1, which is provided on the outermost side, and the plate W2 by the auxiliary current is completed in a shorter time than the welding by the main current. Therefore, the control device 100 may stop the supply of the auxiliary current prior to the main current. Specifically, the control device 100 turns off the switch provided in the auxiliary current-carrying electrode tip 122 to electrically disconnect the welding electrode tip 121 from the auxiliary current-carrying electrode tip 122 and stops the supply of the auxiliary current.

Then, the control device 100 controls the servomotor 16 so that the movable electrode unit 120 is retracted from the work W by the operation of the feed screw mechanism. Then, the nugget is cooled and solidified and the work W is welded.

[Outline of Operation of Spot Welding Device 1]

Next, the outline of the characteristic operation of the spot welding device 1 according to this embodiment will be described with reference to FIGS. 7 and 8.

Auxiliary Current Control Based on Contact Angle with Work W

When the spot welding gun 10 comes into oblique contact with the work W, the spot welding device 1 according to this embodiment controls the auxiliary current which flows from the welding electrode tip 121 to the auxiliary current-carrying electrode tips 122 on the basis of the contact angle. FIG. 7 illustrates the outline of the auxiliary current control based on the contact angle with the work W.

Referring to FIG. 7(1), when the spot welding gun 10 comes into vertical contact with the work W, a current appropriately flows from the welding electrode tip 121 to the main current-carrying electrode tip 131 and the auxiliary current-carrying electrode tips 122. As a result, the nugget N is generated so as to cover the interface between the thinnest plate W1 and the plate W2. In FIG. 7(1), the nugget N with a size of a region L1 is generated at the interface between the thinnest plate W1 and the plate W2.

However, when the spot welding gun 10 comes into oblique contact with the work W, a sufficient nugget N to weld the thinnest plate W1 is not generated. That is, the nugget N is inclined to the extent of the inclination of the spot welding gun 10. As a result, as illustrated in FIG. 7(2), only a nugget N that covers the interface between the thinnest plate W1 and the plate W2 with a region L2 smaller than the region L1 is generated and it is difficult to appropriately weld the thinnest plate W1 which is arranged on the uppermost side.

It is considered that the nugget N is inclined because contact portions P of the welding electrode tip 121 and the main current-carrying electrode tip 131 with the work W deviate from a central axis C. That is, the contact portion P of the work W comes into contact with the electrode tip and is cooled. The cooled portion deviates from the central axis C. As a result, the generated nugget N is asymmetric with respect to the central axis C and is inclined.

The spot welding device 1 according to this embodiment controls the auxiliary current on the basis of the contact angle θ of the spot welding gun 10, as illustrated in FIG. 7(3)(A). Here, the contact angle θ of the spot welding gun 10 can be calculated from the amount of movement of the auxiliary current-carrying electrode tips 122 which are moved independently of the rod 12 (welding electrode tip 121). Therefore, the control device 100 controls the current that flows to the auxiliary current-carrying electrode tips 122 on the basis of the amount of movement of the auxiliary current-carrying electrode tips 122 which are moved independently of the rod 12 (welding electrode tip 121). Specifically, an auxiliary current with a current value greater than a general current value is applied to the auxiliary current-carrying electrode tip 122 which is moved in the negative direction (the A2 direction in FIG. 5) with respect to the movement of the rod 12 and an auxiliary current with a current value less than the general current value is applied to the auxiliary current-carrying electrode tip 122 which is moved in the positive direction (the A1 direction in FIG. 5) with respect to the movement of the rod 12.

FIG. 7(3) illustrates an example in which two auxiliary current-carrying electrode tips 122 are provided. However, one or three or more auxiliary current-carrying electrode tips 122 may be provided. In this case, similarly, the control device 100 controls the auxiliary current which flows to the auxiliary current-carrying electrode tip 122 on the basis of the amount of movement of the auxiliary current-carrying electrode tip 122.

Then, the nugget N is sufficiently grown since a large amount of auxiliary current flows to the interface between the thinnest plate W1 and the plate W2 arranged on the side of the inclined auxiliary current-carrying electrode tip 122. That is, the nugget N which does not sufficiently cover the interface between the thinnest plate W1 and the plate W2 in FIG. 7(2) is grown so as to cover the interface between the thinnest plate W1 and the plate W2 in a wide range, such as a region L3, as illustrated in FIG. 7(3)(B). As a result, even when the spot welding gun 10 comes into oblique contact with the work W, it is possible to appropriately weld the thinnest plate W1 which is arranged on the outermost side.

Auxiliary Current Control Based on Auxiliary Current Value

In general, the thinnest plate W1, the plate W2, and the plate W3 forming the work W are interposed between the movable electrode unit 120 and the fixed electrode unit 130 and are pressed by them. As a result, the welding portions come into contact and are electrically connected to each other. However, in some cases, the thinnest plate W1, the plate W2, and the plate W3 come into contact with each other in portions other than the welding portions in the work W. In the work W, the electrode tips are electrically connected to each other through the contact portions by the pressure of the movable electrode unit 120 and the fixed electrode unit 130 and an unexpected current path is formed. When the unexpected current path is formed, the current supplied from the current source 30A also flows through the current path. As a result, the value of the current which flows through the current path that is scheduled to weld the work W is reduced.

Therefore, the spot welding device 1 according to this embodiment controls the auxiliary current on the basis of the value of the auxiliary current which flows between the electrode tips, particularly between the welding electrode tip 121 and the auxiliary current-carrying electrode tip 122. FIG. 8 illustrates the outline of the auxiliary current control based on the auxiliary current value. FIG. 8 illustrates an example in which one auxiliary current-carrying electrode tip 122 is provided. However, two or more auxiliary current-carrying electrode tips 122 may be provided. In this case, similarly, the control device 100 controls the auxiliary current on the basis of the auxiliary current value.

Figure 8:
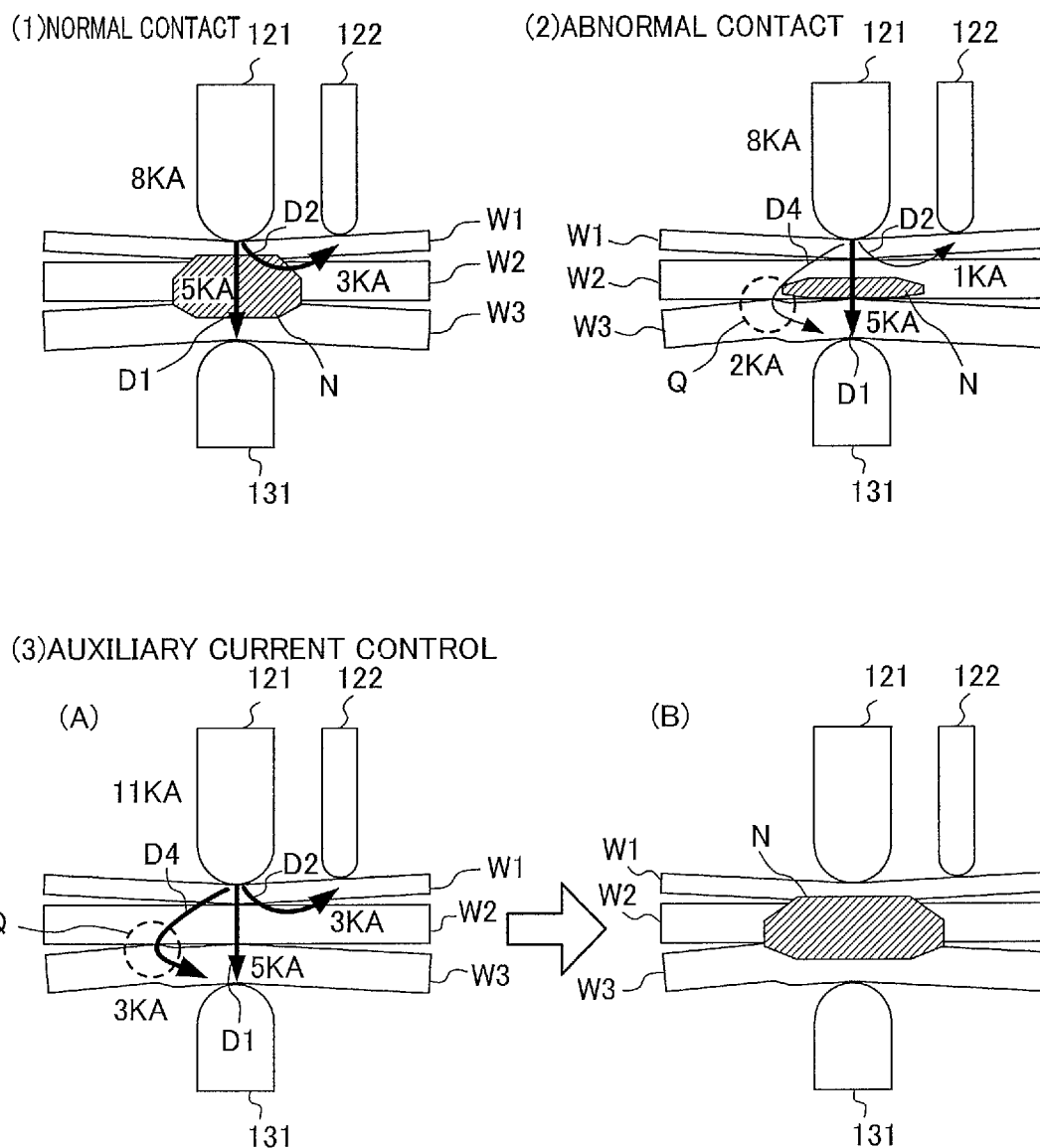
FIG. 8 is a diagram illustrating the outline of the auxiliary current control of the spot welding device according to the embodiment on the basis of an auxiliary current value.

Referring to FIG. 8(1), when the work W is pressed by the movable electrode unit 120 and the fixed electrode unit 130 and only the welding portions come into contact with each other (hereinafter, referred to as a "normal contact" in some cases), the current paths which are scheduled for welding, that is, the current path D1 between the welding electrode tip 121 and the main current-carrying electrode tip 131 and the current path D2 between the welding electrode tip 121 and the auxiliary current-carrying electrode tip 122 are formed between the electrode tips. In the normal contact state of the work W, the current supplied from the current source 30A flows through the current paths D1 and D2. In FIG. 8(1), in a current of 8 KA which is supplied from the current source 30A, a main current of 5 KA flows from the welding electrode tip 121 to the main current-carrying electrode tip 131 through the current path D1 and an auxiliary current of 3 KA flows from the welding electrode tip 121 to the auxiliary current-carrying electrode tip 122 through the current path D2. When the main current and the auxiliary current flow to the work W, the work W is appropriately welded.

Referring to FIG. 8(2), when there is a contact portion other than the welding portion in the work W (hereinafter, referred to as an "abnormal contact" in some cases), a current path to the abnormal contact portion is formed between the electrode tips, in addition to the current path that is scheduled for welding. In FIG. 8(2), there is an abnormal contact portion Q between the plates W2 and W3. As a result, a current path D4 that extends from welding electrode tip 121 to the main current-carrying electrode tip 131 through the abnormal contact portion Q is formed. When the current path D4 through the abnormal contact portion Q is formed, the current supplied from the current source 30A also flows through the current path D4. As a result, the value of the current flowing through the current paths D1 and D2 that are scheduled for welding is reduced. In FIG. 8(2), in a current of 8 KA which is supplied from the current source 30A, a current of 2 KA flows to the current path D4 through the abnormal contact portion Q. Therefore, the auxiliary current of 3 KA that is originally scheduled to flow does not flow through the current path D2, but only an auxiliary current of 1 KA flows through the current path D2. As a result, a sufficient amount of auxiliary current does not flow to the interface between the thinnest plate W1 and the plate W2 and it is difficult to appropriately weld the thinnest plate W1 and the plate W2.

When the abnormal contact portion Q is disposed in the vicinity of the welding portion, the current path between the welding electrode tip 121 and the main current-carrying electrode tip 131 is widened (the current path D1 becomes the current path D1+D4) and the resistance of the current path is reduced. As a result, it is difficult to generate a sufficient amount of Joule heat from the current path and thus to appropriately weld the work W.

Therefore, the spot welding device 1 according to this embodiment controls the auxiliary current on the basis of the value of the current which flows to the auxiliary current-carrying electrode tip 122, as illustrated in FIG. 8(3)(A). In FIG. 8(3)(A), the current value supplied from the current source 30A is controlled so that the value (1 KA) of the auxiliary current which is reduced by the formation of the current path D4 through the abnormal contact portion Q is equal to the current value (3 KA) which is originally scheduled, which will be described in detail below. That is, the control device 100 reduces the resistance value of the variable resistor provided in the current source 30A and increases the total value of the current supplied from the current source 30A from 8 KA to 11 KA to increase the value of the auxiliary current which flows to the auxiliary current-carrying electrode tip 122.

Therefore, even in the work W having the abnormal contact portion Q, a large amount of auxiliary current flows to the interface between the thinnest plate W1 and the plate W2 and the main current that is greater than that in a normal state flows between the welding electrode tip 121 and the main current-carrying electrode tip 131. As a result, the nugget N is sufficiently grown. That is, the nugget N which is not sufficiently grown in FIG. 8(2) is grown to have a sufficient size to weld the work W, as illustrated in FIG. 8(3)(B). As a result, it is possible to constantly obtain a uniform welding result regardless of the contact state in the work W which cannot be determined from the outward appearance.

[Details of Auxiliary Current Control]

As illustrated in FIGS. 7 and 8, the spot welding device 1 according to this embodiment controls the auxiliary current on the basis of the state of the auxiliary current-carrying electrode tip 122, that is, the contact angle of the auxiliary current-carrying electrode tip 122 with respect to the work W or the value of the auxiliary current which flows to the auxiliary current-carrying electrode tip 122 to appropriately weld the work W.

Next, the details of the auxiliary current control based on the state of the auxiliary current-carrying electrode tip 122 will be described with reference to FIG. 9. The nugget N for welding the work W is generated by the Joule heat. Therefore, in this embodiment, the value of the auxiliary current (FIGS. 9(1) and 9(2)) and/or the supply time of the auxiliary current (FIG. 9(3)) is controlled to perform the auxiliary current control. The following auxiliary current control is an illustrative example and the invention can be applied to other control processes which can appropriately weld the thinnest plate W1 arranged on the outermost side on the basis of the state of the auxiliary current-carrying electrode tip 122.

Referring to FIG. 9(1), when welding using the auxiliary current-carrying electrode tip 122 is insufficient, the spot welding device 1 increases the value of the auxiliary current which flows to the auxiliary current-carrying electrode tip 122 to appropriately weld the work W. More specifically, the control device 100 of the spot welding device 1 controls the variable resistor provided in the auxiliary current-carrying electrode tip 122 to supply the auxiliary current with a large current value to the auxiliary current-carrying electrode tip 122.

The case in which the auxiliary current-carrying electrode tip 122 comes into oblique contact with the work W will be described with reference to FIG. 9(1)(A). First, the control device 100 calculates the amount of movement of the auxiliary current-carrying electrode tip 122 which is moved independently of the rod 12 and specifies whether the moving direction is in the negative direction or the positive direction. Then, the control device 100 reduces the resistance value of the variable resistor provided in the auxiliary current-carrying electrode tip 122 which is moved in the negative direction and increases the value of the auxiliary current which flows to the auxiliary current-carrying electrode tip 122. In contrast, the control device 100 increases the resistance value of the variable resistor provided in the auxiliary current-carrying electrode tip 122 which is moved in the positive direction and reduces the value of the auxiliary current which flows to the auxiliary current-carrying electrode tip 122. In this way, it is possible to control the value of the auxiliary current which flows to the auxiliary current-carrying electrode tip 122 on the basis of the contact angle and thus to appropriately weld the thinnest plate W1 which is arranged on the outermost side.

Next, the case in which the work W has an abnormal contact portion will be described with reference to FIG. 9(1)(B). First, the control device 100 acquires the value of the auxiliary current which flows to the auxiliary current-carrying electrode tip 122 and determines whether the acquired current value is equal to or less than the normal value (for example, 3 KA). In this case, when the value of the auxiliary current is equal to or less than the normal value, the control device 100 determines that there is an abnormal contact portion in the work W and increases the auxiliary current which flows to the auxiliary current-carrying electrode tip 122. That is, the control device 100 reduces the resistance value of the variable resistor provided in the auxiliary current-carrying electrode tip 122 so that the auxiliary current easily flows to the auxiliary current-carrying electrode tip 122. Therefore, even when there is an abnormal contact portion in the work W, it is possible to appropriately weld the thinnest plate W1 which is provided on the outermost side.

After the auxiliary current flows to the auxiliary current-carrying electrode tip 122 for a sufficient time to weld the thinnest plate W1 provided on the outermost side, the control device 100 stops the application of the current to the auxiliary current-carrying electrode tip 122, which will not be described in detail. Therefore, the value of the main current which flows to the main current-carrying electrode tip 131 increases and it is possible to appropriately weld the entire work W, in addition to the thinnest plate W1 provided on the outermost side.

Then, referring to FIG. 9(2), a method for increasing the value of the auxiliary current is not limited to the method for controlling the resistance value of the variable resistor provided in the auxiliary current-carrying electrode tip 122. For example, the amount of current supplied from the current source 30A may be increased in order to increase the value of the auxiliary current. The control device 100 of the spot welding device 1 may control the resistance value of the variable resistor provided in the current source 30A to supply the auxiliary current with a large current value to the auxiliary current-carrying electrode tip 122.

Next, the case in which the auxiliary current-carrying electrode tip 122 comes into oblique contact with the work W will be described with reference to FIG. 9(2)(A). When the auxiliary current-carrying electrode tip 122 comes into oblique contact with the work W, the control device 100 controls the resistance value of the variable resistor provided in the current source 30A so that the total value of the current which flows through the current path connecting the electrode tips increases. Then, a current with a value greater than the general value flows through the current path connecting the electrode tips and it is possible to appropriately weld the thinnest plate W1 provided on the outermost side which is difficult to weld due to inclination. In this case, the control device 100 may change the timing to stop the current applied to the auxiliary current-carrying electrode tip 122, depending on the contact angle. That is, after the supply of the current to the auxiliary current-carrying electrode tip 122 which is moved in the positive direction with respect to the rod 12 is cut off, the current may be applied to the auxiliary current-carrying electrode tip 122 which is moved in the negative direction with respect to the rod 12 for a predetermined period of time and then the supply of the current to the auxiliary current-carrying electrode tip 122 may be stopped.

Next, the case in which there is an abnormal contact portion in the work W will be described with reference to FIG. 9(2)(B). When the value of the auxiliary current which flows to the auxiliary current-carrying electrode tip 122 is equal to or less than the normal value, the control device 100 controls the resistance value of the variable resistor provided in the current source 30A so that the total value of the current which flows through the current path connecting the electrode tips increases. Therefore, it is possible to supplement the value of the auxiliary current by the amount which flows to the abnormal contact portion and thus to appropriately weld the thinnest plate W1 which is provided on the outermost side.

Then, referring to FIG. 9(3), when welding using the auxiliary current-carrying electrode tip 122 is insufficient, the spot welding device 1 controls the time when the auxiliary current is applied to the auxiliary current-carrying electrode tip 122 to appropriately weld the work W. More specifically, the control device 100 of the spot welding device 1 controls the switch in the auxiliary current-carrying electrode tip 122 to control the time when the current is applied to the auxiliary current-carrying electrode tip 122.

The case in which the auxiliary current-carrying electrode tip 122 comes into oblique contact with the work W will be described with reference to FIG. 9(3)(A). The auxiliary current needs to be applied to the auxiliary current-carrying electrode tip 122 which is moved in the negative direction with respect to the rod 12 for a time longer than usual in order to ensure a sufficient amount of Joule heat. Therefore, the control device 100 starts the application of the current to the auxiliary current-carrying electrode tip 122 and turns off the switch provided in the auxiliary current-carrying electrode tip 122 which is moved in the positive direction with respect to the rod 12. Then, the control device 100 turns off the switch provided in the auxiliary current-carrying electrode tip 122 which is moved in the negative direction with respect to the rod 12 after a predetermined period of time has elapsed. As a result of the oblique contact, it is possible to supply the auxiliary current to a portion of the interface between the thinnest plate W1 and the plate W2 which is close to the auxiliary current-carrying electrode tip 122 in the negative direction and in which the nugget N is less likely to be generated for a longer time. Therefore, it is possible to appropriately weld the thinnest plate W1 which is provided on the outermost side.

Next, the case in which there is an abnormal contact portion in the work W will be described with reference to FIG. 9(3)(B). When the value of the auxiliary current which flows to the auxiliary current-carrying electrode tip 122 is equal to or less than the normal value, the control device 100 turns off the switch provided in the auxiliary current-carrying electrode tip 122 later than usual. That is, the control device 100 applies the auxiliary current to the auxiliary current-carrying electrode tip 122 for the time required to generate a sufficient nugget N at the interface between the thinnest plate W1 and the plate W2 and then stops the application of the current. Therefore, it is possible to supplement the auxiliary current with the amount which flows to the abnormal contact portion and thus to appropriately weld the thinnest plate W1 which is provided on the outermost side.

The spot welding device 1 according to this embodiment has been described above. According to the spot welding device 1, the state of the auxiliary current-carrying electrode tip 122 is measured and the state of the work W is specified on the basis of the measurement result. That is, the contact angle of the auxiliary current-carrying electrode tip 122 with respect to the work W is specified from the amount of movement of the auxiliary current-carrying electrode tip 122 which is moved independently of the rod 12 (welding electrode tip 121). In addition, it is specified whether there is an abnormal contact portion in the work W on the basis of the value of the auxiliary current which flows to the auxiliary current-carrying electrode tip 122. In the spot welding device 1, when the state of the work W is specified, the auxiliary current which is supplied to the auxiliary current-carrying electrode tip 122 is controlled on the basis of the specified state of the work W. Therefore, it is possible to appropriately weld the thinnest plate W1, regardless of the state of the work W.

The invention is not limited to the above-described embodiment and various changes and modifications of the invention within the scope and spirit of the invention are included in the invention.

For example, in the above-described embodiment, the followings have been described as the details of the auxiliary current control: resistance control (FIG. 9 (1)) for controlling the variable resistor of the auxiliary current-carrying electrode tip 122; current control (FIG. 9 (2)) for controlling the variable resistor of the current source 30A; and switching time control for controlling the switch of the auxiliary current-carrying electrode tip 122 (FIG. 9 (3)). However, only one of the control methods may be applied or combinations of two or more of the control methods may be applied as the auxiliary current control.

In this case, the combinations of the control methods include a control method for setting different current values before and after the switch of the auxiliary current-carrying electrode tip 122 is turned off. That is, for example, when the current control and the switching time control are combined, the total current value may be the same before and after the switch of the auxiliary current-carrying electrode tip 122 is turned off. In addition, the total current value before the switch is turned off may be greater than that after the switch is turned off. The total current value after the switch is turned off may be greater than that before the switch is turned off.

In the above-described embodiment, the auxiliary current control in the state in which the spot welding gun 10 comes into oblique contact with the work W and the auxiliary current control in the state in which there is an abnormal contact portion in the work W have been separately described. However, the invention can also be applied to the case in which the states overlap each other. That is, the invention can be applied even when the spot welding gun 10 comes into oblique contact with the work W and there is an abnormal contact portion in the work W.

In the above-described embodiment, the contact angle of the spot welding gun 10 with respect to the work W is calculated on the basis of the difference between the amount of movement of the welding electrode tip 121 (that is, the amount of movement of the rod 12) and the amount of movement of the auxiliary current-carrying electrode tip 122 (that is, the sum of the amount of movement of the rod 12 and the amount of movement of the moving means). However, the invention is not limited thereto. For example, when a plurality of auxiliary current-carrying electrode tips 122 are provided, the contact angle of the spot welding gun 10 with respect to the work W may be calculated from the difference between the amounts of movement of the respective auxiliary current-carrying electrode tips 122, without using the amount of movement of the welding electrode tip 121.

In addition, the contact angle of the spot welding gun 10 with respect to the work W may be calculated from information other than the amounts of movement, without using the amount of movement of each electrode tip. For example, the contact angle of the spot welding gun 10 with respect to the work W may be calculated using data for the image of the spot welding gun 10 and/or the work W which is captured when the spot welding gun 10 comes into contact with the work W.

The invention claimed is:

1. A spot welding device that welds a work which is formed by overlapping three or more plates, wherein the work has a first face and a second face opposite the first face, and wherein a thinnest plate among the overlapping three or more plates has a plate face that is the first face, the spot welding device comprising:
  a welding electrode that contacts the plate face of the thinnest plate;
  an auxiliary current-carrying electrode that contacts the plate face of the thinnest plate, wherein the auxiliary current-carrying electrode has a polarity opposite to a polarity of the welding electrode, and wherein the auxiliary current-carrying electrode is capable of moving independently of the welding electrode;
  a main current-carrying electrode that contacts the second face of the work so the work being interposed between the welding electrode and the main current-carrying electrode and has a polarity opposite to the polarity of the welding electrode; and
  an auxiliary current control device having a displacement detector, an ammeter, and a controller,
    wherein the displacement detector is provided in the auxiliary current-carrying electrode and determines a first measurement result based on an amount of movement of a predetermined moving means for moving the auxiliary current-carrying electrode;
    wherein the ammeter is provided in the auxiliary current-carrying electrode and determines a second measurement result based on the current which flows from the welding electrode;
    wherein the controller receives the first measurement result and the second measurement result, and wherein the controller is programmed to calculate a contact angle of the welding electrode and the auxiliary current-carrying electrode with respect to the thinnest plate based on the first measurement result and control a current flowing through the auxiliary current-carrying electrode based on the contact angle and the second measurement result.

* * * * *